J. TURCAN.
TORPEDO DISCHARGE FOR SUBMARINES.
APPLICATION FILED NOV. 25, 1918.

1,336,110.

Patented Apr. 6, 1920.
3 SHEETS—SHEET 1.

Inventor
J. Turcan
A. M. Wilson,
Attorney

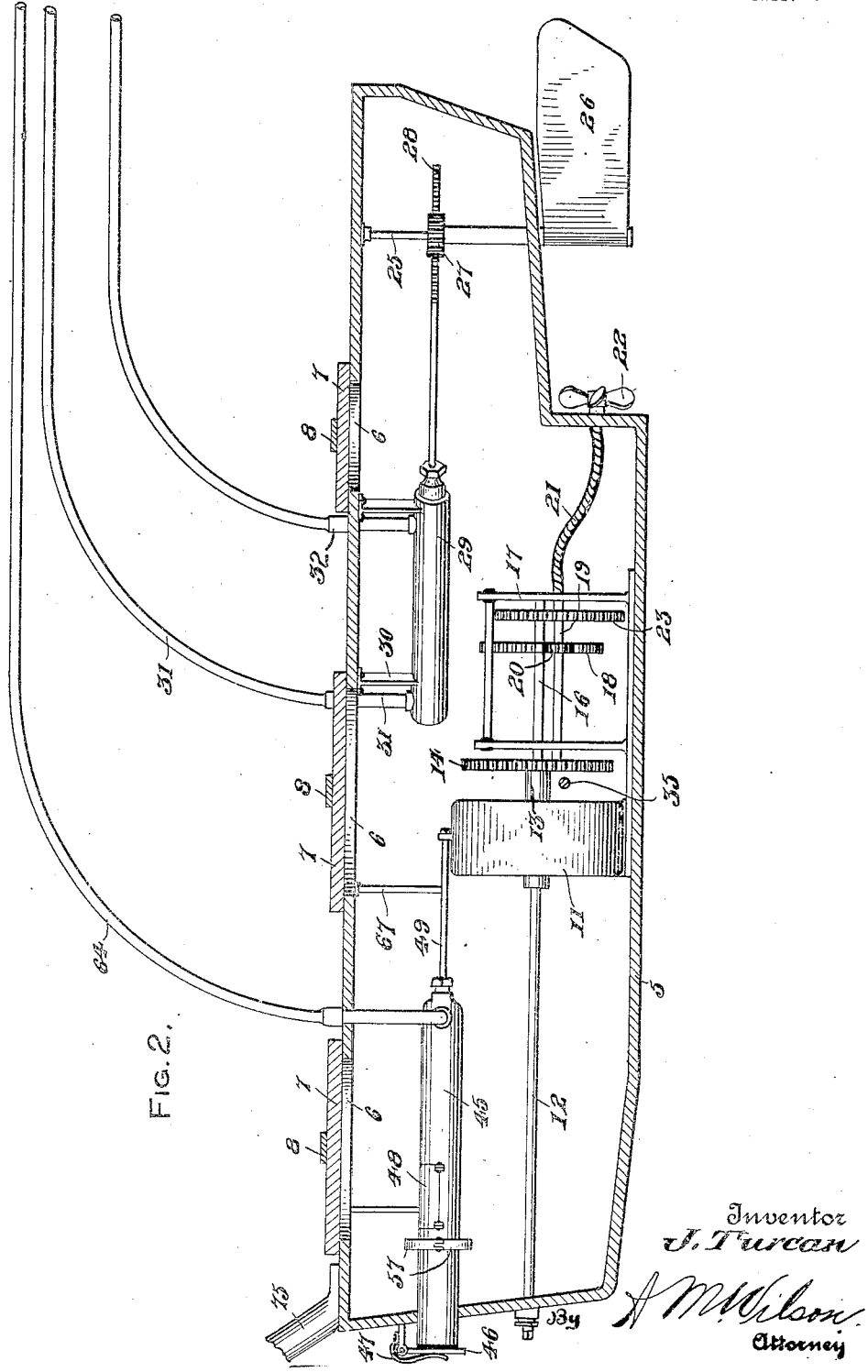

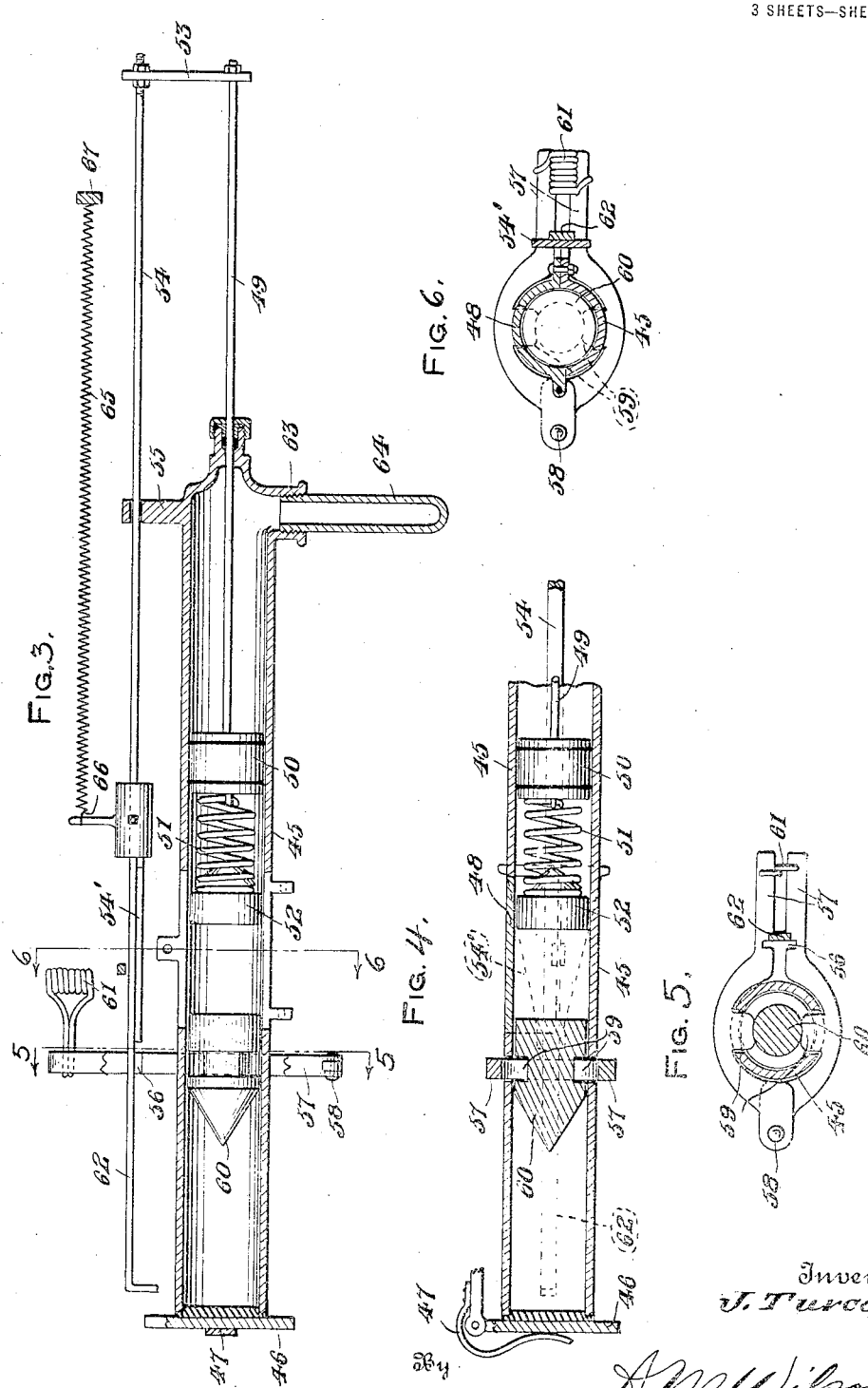

UNITED STATES PATENT OFFICE.

JOHN TURCAN, OF SOUTH AKRON, OHIO.

TORPEDO DISCHARGE FOR SUBMARINES.

1,336,110.  Specification of Letters Patent.  Patented Apr. 6, 1920.

Application filed November 25, 1918. Serial No. 264,031.

*To all whom it may concern:*

Be it known that I, JOHN TURCAN, a citizen of Szecho Slovakia, residing at South Akron, in the county of Summit and State of Ohio, have invented certain new and useful Improvements in Torpedo Discharge for Submarines, of which the following is a specification.

This invention relates to improvements in submarines of that type which may be launched and controlled from the shore or a mother ship and is equipped with a torpedo tube from which a torpedo may be expelled after the submarine has come in contact with an object.

With these and other objects in view, the invention consists in certain novel features, combination and arrangement of parts as will be hereinafter more fully described and set forth in the claims hereto appended.

In the drawings,

Fig. 2 is a vertical longitudinal sectional view of the submarine.

Fig. 3 is a vertical longitudinal sectional view of the torpedo tube with the torpedo in full line.

Fig. 4 is a vertical longitudinal sectional view of the torpedo tube with parts omitted.

Fig. 5 is a horizontal sectional view taken on the line 5—5 of Fig. 3.

Fig. 6 is a sectional view taken on the line 6—6 of Fig. 3.

Figure 1:
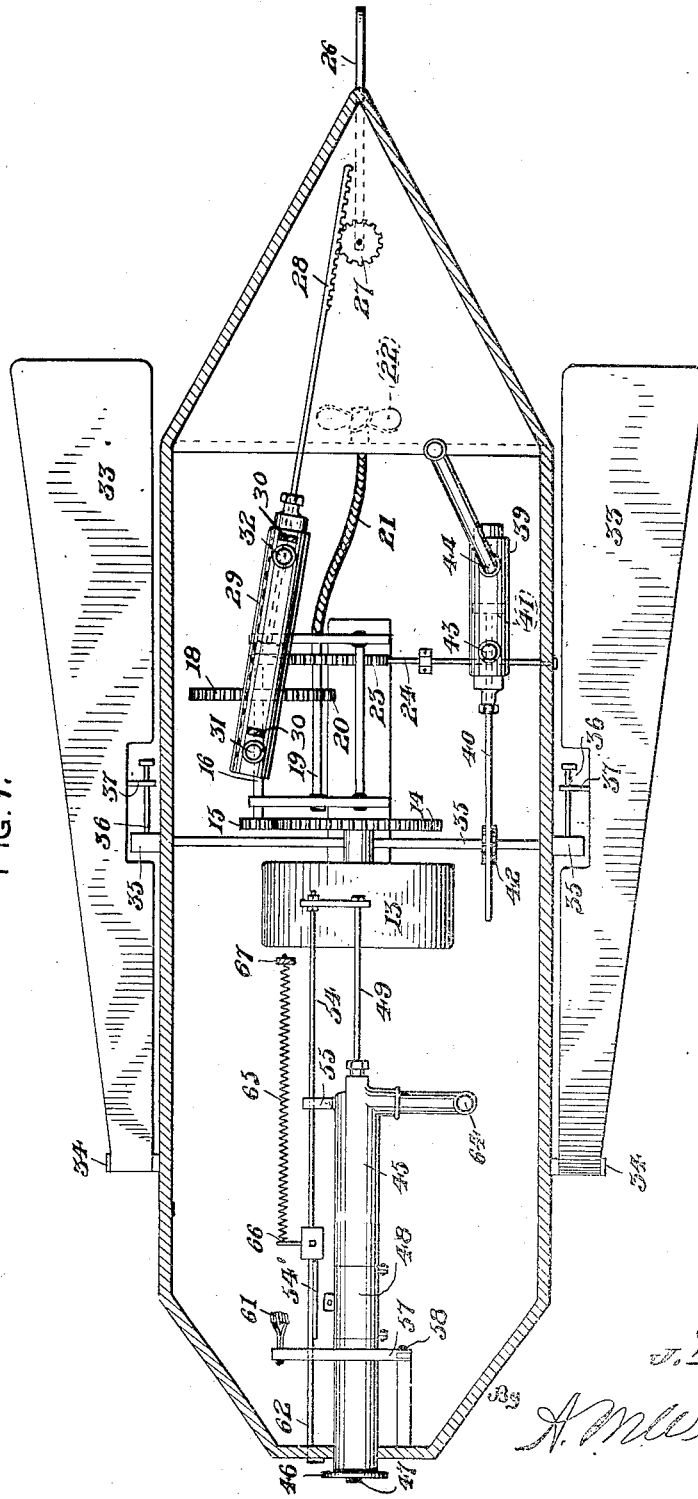
Figure 1 is a transverse sectional view of the submarine.

Referring to the drawings the numeral 5 indicates the body of the submarine, this body is preferably in the form of a ship but any other preferred type may be used, the top of the submarine is provided with a plurality of spaced hatchway openings 6 through which access to the interior is obtained. The hatchway openings are closed by suitable hatches 7, the hatches being held closed by straps 8 which connection closes the openings and forms a watertight joint.

A spring motor 11 is secured within the submarine directly beneath one of the hatchway openings and extending forwardly from and out of the forward end of the submarine is a motor winding shaft 12, it being understood that the extreme end of the shaft is squared to receive a key or crank whereby the motor may be wound up for operation. Extending from the opposite face of the motor is a shaft 13 carrying a gear wheel 14, which gear meshes with a pinion 15 mounted on the end of a rotating shaft 16 supported in the frame 17. The shaft 16 carries a large gear 18 intermediate its ends which in turn meshes with a small gear 20 carried on a shaft 19, this shaft being in turn connected to a flexible shaft 21 which has its free end extended out through the rear of the submarine and has secured thereto a suitable propeller 22.

A ratchet wheel 23 is fixed to the shaft 19 and this ratchet wheel is adapted to be engaged by a sliding dog 24 which has one end extended through the side of the submarine so that it may be readily operated and moved into engagement with the ratchet wheel to hold the shafts and gears against turning, this being clearly illustrated in Fig. 1 of the drawings.

A vertical shaft 25 is located in the rear portion of the submarine and has one end extended through the bottom thereof and connected to this extended end is a rudder 26. To actuate this rudder, I fix a gear wheel 27 intermediate the ends of the shaft 25 and this gear wheel has meshing therewith the teeth of a rack bar 28 which is reciprocably mounted in a cylinder 29 supported by suitable brackets 30 in the submarine. The end of the rack bar 28 which is located within the cylinder 29 is provided with any suitable type of piston and this piston is moved longitudinally within the cylinder by suitable fluid pressure which is admitted into each end of the cylinder through the pipes 31 and 32 respectively. It being understood that when fluid pressure is admitted through pipe 31, the piston will be forced toward the rear end of the cylinder, thus moving the rack bar rearwardly rotating the gear 27, shaft 25 and turning the rudder 26 to the right as illustrated in Fig. 1. When pressure is admitted through pipe 32, the piston is moved toward the forward end of the cylinder thereby moving the rudder to the left or in opposite direction to its first movement.

The submarine has pivoted on opposite sides, a pair of planes 33, these planes adapted to be raised or lowered so that the submarine may submerge or ascend in the water. Each plane is substantially triangular and is pivoted at its apex adjacent the forward end of the submarine as at 34.

A shaft 35 extends transversely through the submarine and has its ends extended beyond the exterior sides thereof, this shaft being mounted for rotation and has secured to each end a rearwardly extending arm 36 which is movable through an eye-bolt 37 which is permanently secured to each of the planes 33. It will be apparent that by virtue of the above described structure that when the shaft 35 is rotated, the movement of the arm 36 through the eye-bolt 37 will cause the elevation or lowering of the planes 33 respectively.

To accomplish the raising and lowering of the planes 33, I provide an air cylinder 39 which is mounted within the submarine and movable within the cylinder is a rod 40 having secured to its inner ends a piston 41. The outer end of the rod is provided with a rack which engages a gear 42 mounted on the shaft 35 whereby upon reciprocating movement of the piston and rod within the cylinder the planes 33 will be moved according to such movement of the piston and its rod.

To accomplish the movement of the rod and its piston, the cylinder 39 is provided with the ports 43 and 44 respectively, which ports are located adjacent each end of the cylinder, the ports 43 and 44 are in communication with fluid pressure supply pipes and thus it will be apparent that when pressure is admitted through port 43 the piston will be moved rearwardly in its cylinder drawing the rack bar rearwardly consequently lowering the arms 36 and dropping the planes downwardly in the dotted line position, it being apparent however, that if pressure is forced through port 44, the piston will be moved forwardly in the cylinder causing a reverse rotation of the shaft 35 which will raise the arms 36 and move the planes upwardly in the dotted line position.

Mounted longitudinally within the submarine above the shaft 12 and parallel therewith, is a cylindrical torpedo tube 45, the forward end of this tube being extended through the bow of the submarine as clearly illustrated in Fig. 2 of the drawings, this extended end is normally closed by pivoted cover 46 which is held against accidental opening by a spring 47. The intermediate portion of the tube is provided with a hinged cover 48 whereby access to the interior may be obtained so that a torpedo may be readily loaded into the tube to be expelled therefrom.

A piston rod 49 is longitudinally slidable in the cylindrical tube 45 and has secured to its inner end a piston head 50 and resiliently connected to this head by a coiled spring 51 is an auxiliary piston head 52. The outer end of the rod 49 has secured thereto a link 53 which permanently connects the rod 49 to an operating member 54 which is slidably mounted through a guide 55 extended laterally from the rear end of the tube 45. The forward end of this member is wedge-shaped and is adapted to move between and in the slot 56 of the opposed pivoted jaws 57 which jaws are pivoted together as at 58 and surround the tube 45 near its forward end. The jaws are provided with inwardly extending lugs 59 which enter through suitable openings in the tube 45 to engage the torpedo 60 which is located within the tube to prevent its discharge from the tube accidentally.

The jaws 57 are normally held closed by a suitable spring 61 which is secured to their free end remote from the pivot 58, this assuring the locking of the jaws into engagement with the torpedo until it is desired to expel the latter from its tube 45.

An operating rod 62 has one end connected to the wedge-shaped end 54' of the member 54 and its free end is extended forwardly of the jaws 57 so that upon forward longitudinal movement of the piston rod 49 and member 54, the extreme end of this rod 62 will engage the cover 46 and open this cover against the tension of the spring 47 to permit of the outward passage of the torpedo which is expelled from the tube by the auxiliary and main piston heads 52 and 50 respectively.

To accomplish the longitudinal movement of the piston rod, I provide the cylinder 45 near its rear end with a port 63 which has connected thereto the free end of the pipe 64 through which fluid pressure is admitted to actuate the piston head.

To assist in returning the operating member 54 and piston 49 to their normal positions after the pressure has been exhausted from the cylinder, I provide a contractile spring 65, one end of which is connected as at 66 to the wedge-shaped member 54' and its opposite end to a suitable support 67.

The supply pipes and ports above described are adapted to receive fluid from a distant supply for operating the part communicating therewith as will be obvious.

What I claim as new is:—

1. In combination with a submarine, a torpedo launching device including a tube projecting from said submarine, a swinging closure gate for the projecting end thereof, a torpedo within the tube, means for holding the torpedo stationary in said tube, a piston in said tube rearwardly of said torpedo and axially alined therewith, means for supplying fluid to said tube to operate said piston, and means connected to said piston for opening the tube closure gate and releasing the torpedo.

2. In combination with a submarine, a torpedo launching device including a tube projecting from said submarine, a swinging closure gate for the projecting end thereof, a torpedo within the tube, means for holding the torpedo stationary in said tube, a piston in said tube rearwardly of said torpedo and axially alined therewith, means for supplying fluid to said tube to operate said piston, and means connected to said piston for opening the tube closure gate and releasing the torpedo, the gate opening means operating in advance of the torpedo releasing means.

3. In combination with a submarine, a torpedo launching device including a tube projecting from said submarine, a swinging closure gate for the projecting end thereof, a torpedo within the tube, means for holding the torpedo stationary in said tube, a piston in said tube rearwardly of said torpedo and axially alined therewith, means for supplying fluid to said tube to operate said piston, means connected to said piston for opening the tube closure gate, and means for restoring the gate opening means to normal inoperative position upon release of fluid pressure in the tube.

4. In a submarine, a torpedo tube carried thereby and projecting therefrom, a tensioned gate closure for the projecting end of said tube, the tube within the submarine having oppositely arranged cut away portions, pivoted jaws associated with said tube and having lugs extending through said tube openings for movement arresting engagement with a torpedo, means for holding the jaws normally operative, a piston within the tube, fluid pressure means associated with said tube for operating said piston and means operated by said piston for causing the torpedo engaging lugs of the jaws to be disengaged therefrom upon a forward movement of the piston.

5. In a submarine, a torpedo tube carried thereby and projecting therefrom, a tensioned gate closure for the projecting end of said tube, the tube within the submarine having oppositely arranged cut away portions, pivoted jaws associated with said tube and having lugs extending through said tube openings for movement arresting engagement with a torpedo, means for holding the jaws normally operative, a piston within the tube, fluid pressure means associated with said tube for operating said piston and means operated by said piston for causing the torpedo engaging lugs of the jaws to be disengaged therefrom upon a forward movement of the piston, the last named means operating to release the torpedo in advance of the piston contacting the torpedo.

6. In a submarine, a torpedo tube carried thereby and projecting therefrom, a tensioned gate closure for the projecting end of said tube, the tube within the submarine having oppositely arranged cut away portions, pivoted jaws associated with said tube and having lugs extending through said tube openings for movement arresting engagement with a torpedo, means for holding the jaws normally operative, a piston within the tube, fluid pressure means associated with said tube for operating said piston and means operated by said piston for causing the torpedo engaging lugs of the jaws to be disengaged therefrom upon a forward movement of the piston, the last named means operating to release the torpedo in advance of the piston contacting the torpedo, and means carried by the torpedo releasing means for opening the tube closure in advance of the operation of releasing the torpedo.

In testimony whereof I affix my signature.

JOHN TURCAN.